United States Patent
Hamada et al.

(10) Patent No.: US 9,061,374 B2
(45) Date of Patent: Jun. 23, 2015

(54) LASER/ARC HYBRID WELDING METHOD AND METHOD FOR PRODUCING WELDED MEMBER USING SAME

(75) Inventors: Takeshi Hamada, Kobe (JP); Taizou Kobashi, Fujisawa (JP); Shinya Ishigai, Shinagawa-ku (JP); Masahiro Matsunami, Shimonoseki (JP); Eiichi Suzuki, Shimonoseki (JP)

(73) Assignees: Kobe Steel, Ltd., Kobe-Shi (JP); Kobe Special Tube Co., Ltd., Shimonoseki-Shi (JP)

(*) Notice: Subject to any disclaimer, the term of this patent is extended or adjusted under 35 U.S.C. 154(b) by 145 days.

(21) Appl. No.: 13/583,201
(22) PCT Filed: Mar. 4, 2011
(86) PCT No.: PCT/JP2011/055121
§ 371 (c)(1), (2), (4) Date: Sep. 6, 2012
(87) PCT Pub. No.: WO2011/111634
PCT Pub. Date: Sep. 15, 2011

(65) Prior Publication Data
US 2012/0325787 A1   Dec. 27, 2012

(30) Foreign Application Priority Data
Mar. 8, 2010 (JP) ................... 2010-050611

(51) Int. Cl.
*B23K 26/20* (2014.01)
*B23K 9/235* (2006.01)
(Continued)

(52) U.S. Cl.
CPC .............. *B23K 26/265* (2013.01); *B23K 26/20* (2013.01); *B23K 9/235* (2013.01);
(Continued)

(58) Field of Classification Search
CPC .... B23K 26/00; B23K 26/1429; B23K 26/20; B23K 28/02; B23K 9/16; B23K 9/23; B23K 9/235

USPC .......... 219/121.63, 121.64, 121.76, 59.1–61, 219/136, 137 R; 228/230–232
See application file for complete search history.

(56) References Cited

U.S. PATENT DOCUMENTS 5,821,493 A   10/1998   Beyer et al.
8,604,382 B2 *   12/2013   Yano et al. ............... 219/121.64
(Continued)

FOREIGN PATENT DOCUMENTS

| CN | 101347870 A | 1/2009 |
| CN | 101362256 A | 2/2009 |

(Continued)

OTHER PUBLICATIONS

A.G. Grigoriantz et al., "Fabrication procedures of laser processing", 2006, pp. 427-429, Moscow, Publishing office of the Bauman Moscow State Technical University.
(Continued)

*Primary Examiner* — Samuel M Heinrich
(74) *Attorney, Agent, or Firm* — Studebaker & Brackett PC (57) ABSTRACT

Disclosed are: a welding method capable of increasing the welding speed up to approximately 20 m/min., yet capable of producing good bead configurations and preventing welding defects such as blowholes; and a method of producing a welded member using the welding method. Specifically disclosed is a laser/arc hybrid welding method for butt-welding flat plates of stainless steel, titanium, or titanium alloy, or butt-welding both ends of a strip-shaped plate of stainless steel, titanium, or titanium alloy which has been formed into a tubular shape, wherein in the butt welding, the laser beam irradiation and the arc discharge trace the same welding line in such a manner that laser welding is followed by TIG arc welding.

6 Claims, 5 Drawing Sheets

(51) Int. Cl.
*B23K 28/02* (2014.01)
*B23K 26/26* (2014.01)
*B23K 26/14* (2014.01)
*B23K 26/32* (2014.01)
*B23K 9/167* (2006.01)
*B23K 26/12* (2014.01)

(52) U.S. Cl.
CPC ........ *B23K 26/1429* (2013.01); *B23K 26/3206* (2013.01); *B23K 26/322* (2013.01); *B23K 2203/04* (2013.01); *B23K 2203/14* (2013.01); *B23K 9/167* (2013.01); *B23K 26/123* (2013.01); *B23K 28/02* (2013.01)

(56) References Cited

U.S. PATENT DOCUMENTS

| | | | |
|---|---|---|---|
| 2004/0000539 A1 | 1/2004 | Takikawa et al. | |
| 2004/0099644 A1 | 5/2004 | Allen | |
| 2005/0263500 A1* | 12/2005 | Briand et al. | 219/121.64 |
| 2007/0246446 A1 | 10/2007 | Lee et al. | |
| 2009/0032504 A1* | 2/2009 | Kamei | 219/121.64 |
| 2011/0095002 A1 | 4/2011 | Katayama et al. | |

FOREIGN PATENT DOCUMENTS

| | | | |
|---|---|---|---|
| CN | 101549440 A | | 10/2009 |
| JP | S 61-172682 A | | 8/1986 |
| JP | H01-241392 | | 9/1989 |
| JP | H06-198472 | | 7/1994 |
| JP | 6-210479 A | | 8/1994 |
| JP | 6-238474 A | | 8/1994 |
| JP | 06238474 A | * | 8/1994 |
| JP | H 07-323386 A | | 12/1995 |
| JP | 8-90265 A | | 4/1996 |
| JP | H 10-174379 A | | 6/1998 |
| JP | 10244369 A | * | 9/1998 |
| JP | 2001-018081 A | | 1/2001 |
| JP | 2001-287061 A | | 10/2001 |
| JP | 2004-223543 A | | 8/2004 |
| JP | 2005-334974 A | | 12/2005 |
| JP | 2008-502485 A | | 1/2008 |
| JP | 2008-221314 A | | 9/2008 |
| JP | 2008-284588 A | | 11/2008 |
| JP | 2009-262182 A | | 11/2009 |
| JP | 2010-023048 A | | 2/2010 |
| WO | 2007/032176 A1 | | 3/2007 |
| WO | 2010/005025 A1 | | 1/2010 |

OTHER PUBLICATIONS

Ming Gao et al., "Effects of gas shielding parameters on weld penetration of $CO_2$ laser-TIG hybrid welding", Journal of Materials Processing Technology, Apr. 12, 2007, pp. 177-183, vol. 184.

International Search Report, issued from the International Bureau, in corresponding International Application No. PCT/JP2011/055121, mailed Jun. 7, 2011, pp. 1-3.

* cited by examiner

LASER/ARC HYBRID WELDING METHOD AND METHOD FOR PRODUCING WELDED MEMBER USING SAME

TECHNICAL FIELD

The present invention relates to a welding method for butt-welding stainless steel, titanium, or a titanium alloy and a method for producing a welded member by the welding method. Hereinafter, the present invention will be described using titanium or a titanium alloy (hereinafter, collectively simply referred to as "titanium") as an example; however, the present invention should not be limited to the example.

BACKGROUND ART

Since being excellent in corrosion resistance, titanium has been used for heat exchangers and condensers in plants for petrochemical industries, thermal and nuclear power generation, and seawater desalination as well as spacecraft and aircraft fields. In the above-mentioned applications, titanium is used as a welded pipe or a member obtained by welding a welded pipe and a tube plate. Particularly, those having an outer diameter of about 12 to 60 mm and a plate thickness of about 0.3 to 2.5 mm are used as a welded pipe.

In general, welding of a titanium pipe is carried out by TIG arc. TIG arc welding is advantageous in the respect that a good bead shape can be formed; however, although it depends on the plate thickness, the welding speed in the case of the above-mentioned plate thickness of 0.3 to 2.5 mm is not more than about 9 m/min (not more than 7 m/min in the case of the plate thickness of 0.5 mm, and not more than 2 m/min in the case of the plate thickness of 1.2 mm). On the other hand, laser enables deep penetration and high speed welding due to having high energy density as a heat source and laser welding can be carried out with little total heat input in a mother material and a width of a heat-affected zone by welding becomes extremely narrow. Therefore, the cooling rate of a welded metal is high and the performance of a welded part (toughness or the like) is good. However, in the case of laser welding, if key holes penetrating through a plate thickness are formed and unstably fluctuated, a current into which a gas is entrained is generated in a peripheral welding pool. If the entrained gas forms foams and the foams are solidified as they are, welding defects such as blow holes may tend to be formed in a welded part.

For example, Patent Documents 1 to 4 disclose welding methods by which weldability is improved and welding defects such as blow holes are suppressed, and which make use of the advantageous point of the laser welding that the welding speed is high. Patent Document 1 discloses a welding method employing plasma welding and laser welding. In more detail, the method improves the butt weldability (melting depth and bead width) and the welding speed by carrying out laser welding after preheating by a plasma torch. Patent Documents 2 and 3 disclose methods which prevent formation of nodular projections in the inner face of a metal pipe and occurrence of welding defects such as blow holes by carrying out laser welding after preheating by high frequency. Patent Document 4 discloses a method which prevents formation of blow holes and solidification cracking by radiating two laser beams to a molten pool at the time of laser welding.

PRIOR ART DOCUMENTS

Patent Documents

Patent Document 1: Japanese Patent Application National Publication No. 2008-502485
Patent Document 2: JP-A-2001-18081
Patent Document 3: JP-A-2001-287061
Patent Document 4: JP-A-8-90265

SUMMARY OF THE INVENTION

Problems to be Solved by the Invention

The present invention aims to provide a welding method for carrying out welding at a high welding speed with a good bead shape while suppressing welding defects such as blow holes and a method for producing a welded member by employing the welding method.

The welding method of the present invention which solves the problems is a laser/arc hybrid welding method for butt-welding flat plates of stainless steel, titanium, or a titanium alloy, or butt-welding both ends of a strip-shaped plate of stainless steel, titanium, or a titanium alloy which has been formed into a tubular shape, wherein in a butted part, welding is carried out with making laser beam irradiation and arc discharge trace the same welding line in such a manner that laser welding is followed by TIG arc welding.

It is preferable that the focal point of a laser beam for the laser welding is at a position above an object member to be welded and the laser beam is so defocused as to make the laser beam diameter radiated to the object member to be welded not smaller than 1 mm.

It is preferable that in the laser welding, the laser beam is radiated being slanted to the welding moving direction so that an angle between the vertical direction and the laser beam is within a range of 10° or narrower, or the laser beam is radiated vertically, and in the TIG arc welding, a tip of a welding torch is slanted to the welding moving direction so that an angle between the vertical direction and the welding torch is within a range of 10 to 45°.

It is preferable that the interval LA between the position of laser beam irradiation in the laser welding and a targeted position of arc discharge in the TIG arc welding is 3 to 7 mm; that the welding is carried out in argon gas; or that torch shield, after shield, and back shield in the TIG arc welding are carried out with argon gas. Furthermore, it is also preferable that preheating by TIG arc is carried out prior to the laser welding in the welding method of the present invention.

The present invention also includes a method for producing a flat plate or tubular butt-welded member by any of the above-mentioned welding method.

Effects of the Invention

According to the present invention, the welding can be accelerated, the bead shape is made smooth and wide, and the welding defects such as blow holes can be suppressed.

BRIEF DESCRIPTION OF THE DRAWINGS

FIG. 3($a$) is a drawing showing a state where a defocused laser beam is radiated and FIG. 3($b$) is a graph showing the effect of the focal length and defocused quantity on the radiated laser diameter.

MODE FOR CARRYING OUT THE INVENTION

Inventors of the present invention have made investigations to find a welding method which makes use of respective good points of TIG arc welding commonly employed for a titanium pipe and laser welding. As a result, regarding hybrid welding by laser welding and TIG arc welding, the inventors have found that the above-mentioned problems can be accomplished by welding with making laser beam irradiation and arc discharge trace the same welding line in such a manner that laser welding is followed by TIG arc welding.

In other words, the present invention has a particular characteristic in that TIG arc welding follows laser welding, and if the angle of a TIG torch is an angle of advance, that is, if the tip end of the TIG torch is kept slanting toward the moving direction of the welding from the downward vertical direction, the width and smoothness of a bead are controlled to be good. Further, the TIG arc welding following the laser welding can discharge foams in the welding pool formed by the laser welding.

Figure 1:
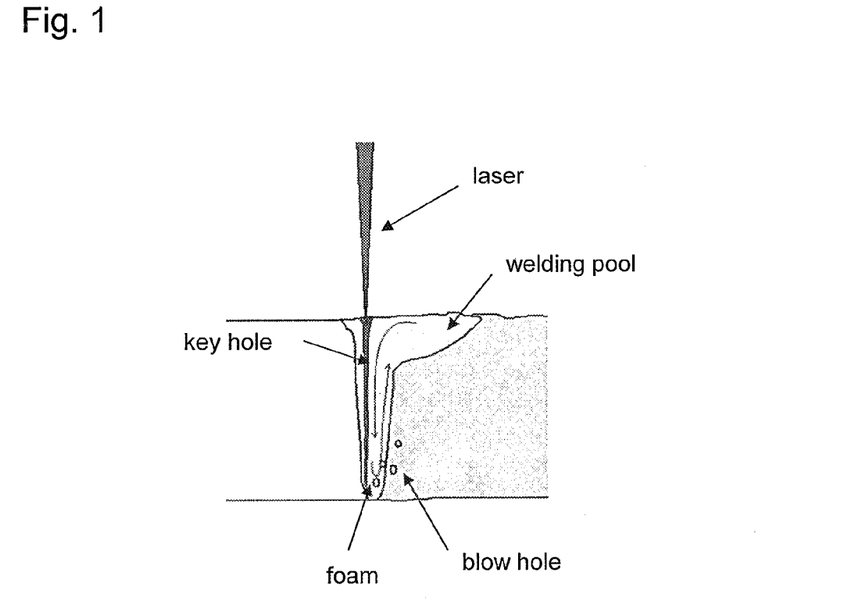
FIG. 1 is a schematic illustration showing a state where key holes and blow holes are formed in the case the focal point of a laser beam exists on the surface of an object member to be welded.

In the laser welding in the present invention, it is preferable that the focal point of a laser beam is at a position above an object member to be welded and that the laser beam is so defocused as to make the laser beam diameter (diameter) radiated to the object member to be welded not smaller than $\phi 1$ mm. In the case of converged irradiation, which is laser irradiation with a focal point on the surface of the object member to be welded, is carried out, blow hole formation becomes significant because of unstable fluctuation of key holes as shown in FIG. 1. However, if a laser beam is defocused, key hole formation can be prevented or key holes can be made shallow. As long as welding can be carried out, the wider the diameter of a laser beam radiated to the object member to be welded in the case of defocusing is, the better. Consequently, the diameter is more preferably not smaller than $\phi 1.1$ mm. In order to make welding possible even if the diameter of the laser beam radiated to the object member to be welded is made large, it is necessary to increase the laser output power.

In the laser welding, it is preferable that a laser beam is radiated being slanted to the welding moving direction so that an angle between the vertical direction and the laser beam (hereinafter, referred to as a "laser irradiation angle") is within a range of 10° or narrower or that the laser beam is radiated vertically, and in the TIG arc welding, it is preferable that the tip of the welding torch is slanted to the welding moving direction so that an angle between the vertical direction and the welding torch (hereinafter, referred to as a "TIG torch angle") is within a range of 10 to 45°. If the laser irradiation angle exceeds 10°, high laser output power is required to carry out welding. The laser irradiation angle may be 0° (that is, a laser beam is radiated vertically); however, because of reflection damage (damage of a head or the like by a reflected beam), it is preferably more than 0°. Since the TIG torch is installed adjacently behind laser, the TIG torch angle is preferably not narrower than 10°. On the other hand, the TIG torch angle is preferably not wider than 45°. If the TIG torch angle exceeds 45°, melting is slight and the bead width irregularly becomes wider, that is, the contribution to welding and the bead shape are deteriorated. The lower limit of the laser irradiation angle is preferably 3° and more preferably 4° and the upper limit of the laser irradiation angle is preferably 8° and more preferably 7°. The lower limit of the TIG torch angle is preferably 15° and more preferably 20° and the upper limit of the TIG torch angle is preferably 40° and more preferably 35° (particularly preferably 30°).

The interval LA between the position of laser beam irradiation in the laser welding and a targeted position of arc discharge in the TIG arc welding is preferably 3 to 7 mm. By controlling the LA to be 3 mm or longer, the effect of use of laser irradiation and TIG arc discharge in combination can be effectively exerted without mutual interference. On the other hand, if the LA is too wide, the effect of the following TIG arc welding cannot be exerted sufficiently and therefore, it is preferably 7 mm or shorter. The lower limit of the LA is more preferably 4 mm, and the upper limit of the LA is more preferably 6 mm and further preferably 5 mm.

Preferably, the welding method of the present invention is carried out in argon gas, or torch shield, after shield, and back shield of the TIG arc welding is carried out with argon gas. Oxidation of a welded part can be prevented by carrying out welding or shield in such an atmosphere.

Figure 2:
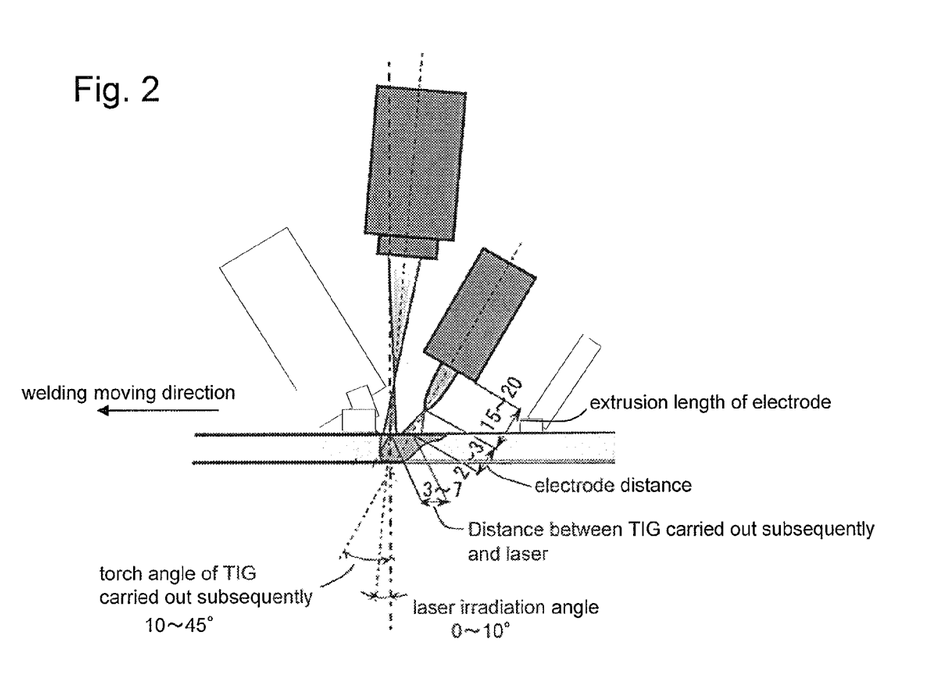
FIG. 2 is a drawing showing one example of the welding method of the present invention.

One example of the welding method of the present invention is shown in FIG. 2. In the case of carrying out TIG arc welding, it is preferable to properly control the electrode distance (the distance between the tip end of the electrode and the object member to be welded in the extension of a straight line in the longitudinal direction of the electrode) and the extrusion length of the electrode, and the electrode distance is about 2 to 3 mm and the extrusion length of the electrode is generally about 15 to 20 mm. TIG arc welding in the welding method of the present invention may be carried out without using a filler metal.

The laser beam to be employed for the welding method of the present invention is not particularly limited as long as it can supply energy to the object member to be welded and may be, for example, a gas laser such as a $CO_2$ laser; a solid laser such as a YAG laser, a disk laser, or a fiber laser; or a semiconductor laser (LD) with high heat exchange efficiency. The beam form of the laser beam is not particularly limited and may be circular, elliptical, and rectangular. In the case the beam form is rectangular, it is possible to carry out good welding almost the same as that in the case of a defocused circular beam having the same diameter as the beam length of the rectangular beam in the welding direction and the same beam density (output power/area) of the rectangular beam. It is preferable that the width (the length in the direction perpendicular to the welding direction) of the rectangular beam is smaller than the diameter of the above-mentioned defocused circular beam and in such a case, the area of the irradiated beam becomes small and welding with low output power is made possible.

In the welding method of the present invention, preheating may be further carried out with TIG arc, prior to the laser welding. Preheating with TIG arc prior to laser welding can improve absorption of laser so that good welding can be carried out even if the output power of a laser apparatus is suppressed. The welding condition of the TIG arc carried out prior to laser welding may be the same as that of the TIG arc welding following the laser welding.

The welding method of the present invention can be employed for stainless steel, titanium, or a titanium alloy to produce a tubular butted member and a flat plate butted member. If the above-mentioned factors are satisfied, all of high welding speed, a smooth and wide bead shape, and suppression of welding defects (blow holes or the like) can be realized. According to the welding method of the present invention, a welding speed of at highest about 20 m/min can be obtained in the case of the above-mentioned plate thickness in a range of 0.3 to 2.5 mm and it is at least about 2 times as fast as that in conventional welding (at highest 15 m/min in the case of a plate thickness of 0.5 mm and at highest 8 m/min in the case of a plate thickness of 1.2 mm).

EXAMPLES

Hereinafter, the present invention will be described in more detail with reference to examples. It is not intended that the present invention be limited to the following examples and of course modifications can be made properly without departing from the spirit of the present invention described herein. The present invention includes all of the modifications within its technical scope.

Figure 3:
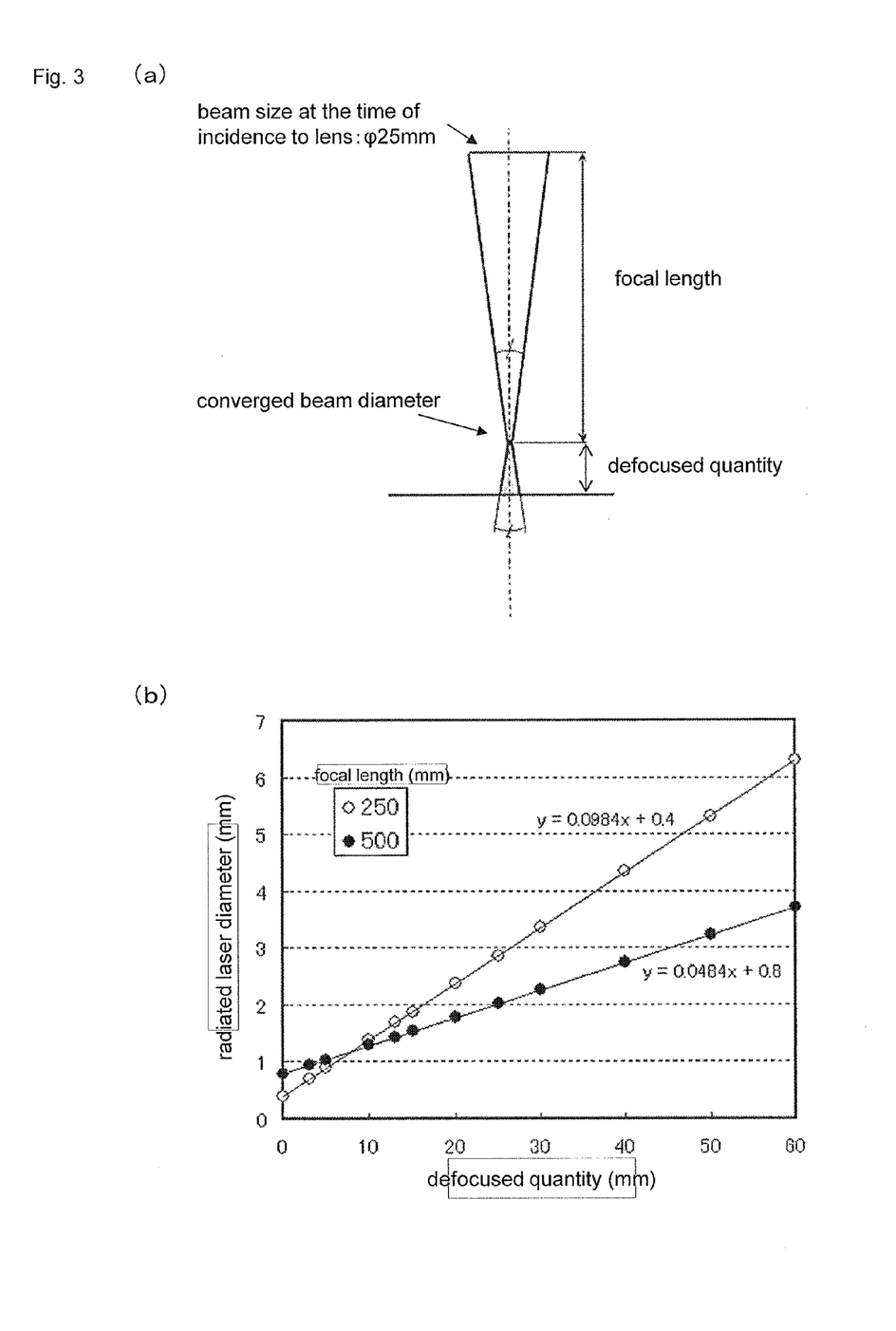

A fiber laser welding machine with the maximum output power of 10 kW (welding machine: manufactured by IPG) was used as a laser welding machine and the effect of focal length and defocused quantity on the radiated laser diameter in the case of a laser irradiation angle of 0° (that is, downward vertical direction) were investigated. Table 1 and FIG. 3 show a relationship between the defocused quantity and the radiated laser diameter in the case the focal length is 250 mm or 500 mm.

TABLE 1

| defocused quantity (mm) | focal length (mm) | |
|---|---|---|
| | 250 | 500 |
| | laser beam diameter (mm) | |
| 0 | 0.40 | 0.80 |
| 3 | 0.70 | 0.95 |
| 4 | 0.79 | 0.99 |
| 5 | 0.89 | 1.04 |
| 6 | 0.99 | 1.09 |
| 9 | 1.29 | 1.24 |
| 10 | 1.38 | 1.28 |
| 13 | 1.68 | 1.43 |
| 15 | 1.88 | 1.53 |
| 20 | 2.37 | 1.77 |
| 25 | 2.86 | 2.01 |
| 30 | 3.35 | 2.25 |
| 40 | 4.34 | 2.74 |
| 50 | 5.32 | 3.22 |
| 60 | 6.30 | 3.70 |

Experimental Example 1

Example 1

Laser welding was followed by TIG arc welding in the following condition to execute welding at a welding speed of 4 to 15 m/min. Based on the above-mentioned results, the laser welding was carried out in a manner that the radiated laser diameter was adjusted by controlling the focal length to be 250 and 500 mm and the defocused quantity to be −3 (in a plate) to +60 mm (the radiated laser diameter was ϕ0.4 to 3.7 mm) and laser output power was controlled. Argon gas was employed for TIG torch shield, after shield, and back shield and the interval LA between the irradiation position of laser beam in the laser welding and the targeted position of the arc discharge in the TIG arc welding was 5 mm.
 Laser Welding Condition (Carried Out Previously)
 Laser welding machine: Fiber laser welding machine with the maximum output power of 10 kW manufactured by IPG
  Laser irradiation angle: 5°
  TIG Arc Welding (Carried Out Subsequently)
  TIG welding machine: Manufactured by Daihen
  Electric current: Maximum 500 A (welding current 170 A)
  Shield gas: Argon
  Extrusion Length of electrode: 15 to 17 mm
  Electrode distance: 2 mm
  TIG torch angle: angle of advance 30°
  Tungsten electrode (negative): Diameter 4 mm; electrode bar tip end angle 60°
 Object Member to be Welded
  Material: Pure Ti
  Shape: Plate thickness 0.5 mm and 1.2 mm
  Outer diameter of tube ϕ19 mm
  Welding length 1 m The entire length of a tubular member welded in the above-mentioned condition was inspected by eddy current inspection according to JIS H0515 and formation of blow holes was observed by radiographic examination according to JIS Z3107 in the high signal part in the eddy current inspection or in an arbitrary region with a welding length of 300 mm.

Figure 4:
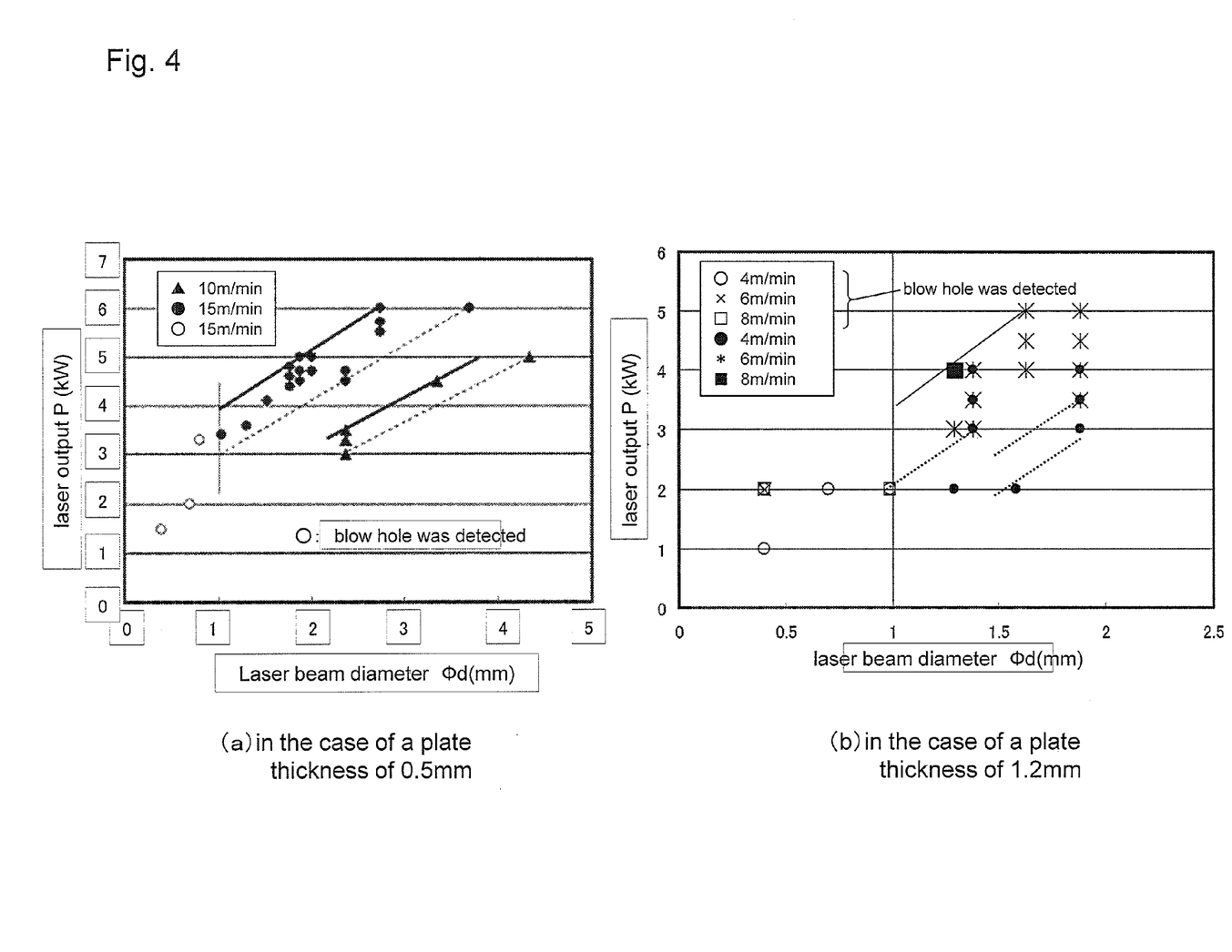
FIG. 4 is an illustration showing a relationship between the laser beam diameter and formation of blow holes in the case of a plate thickness of 0.5 mm or 1.2 mm.

The results are shown in FIG. 4. FIG. 4 is an illustration showing a relationship between the laser beam diameter and formation of blow holes in the case of a plate thickness of 0.5 mm or 1.2 mm. In both cases, when the laser beam was defocused to give a laser beam diameter of ϕ1 mm or larger, formation of blow holes was suppressed. In FIG. 4, the welded part was cut in the case the laser output power was on the solid line or higher and on the other hand, an unjoined part was left in the case the laser output power was on the dotted line or lower. Consequently, the range surrounded by the solid line and the dotted line in FIG. 4 shows a range of a proper welding condition.

Comparative Example 1

Existence or non-existence of blow hole formation was observed in the same manner as in Example 1, except that welding was carried out by laser welding alone. As a result, in the case of laser welding alone, when the laser beam was defocused to give a laser beam diameter of ϕ1.25 mm or larger, formation of blow holes was suppressed.

According to Example 1 and Comparative Example 1, it was revealed that blow hole formation can be suppressed by defocusing the laser beam to give a laser beam diameter of a specified level or more and also that the blow hole formation can be suppressed even with a smaller laser beam diameter by carrying out TIG arc welding following the laser welding. This is supposedly attributed to that the heat input time in the butt-welding direction could be made longer, that is, a welding pool could be made longer by enlarging the laser beam diameter by defocusing or carrying out the TIG arc welding following the laser welding, and this significantly influences on suppression of blow hole formation. Consequently, as long as welding can be carried out, it is preferable that the laser beam diameter is as large as possible (that is, being defocused).

Experimental Example 2

Figure 5A:
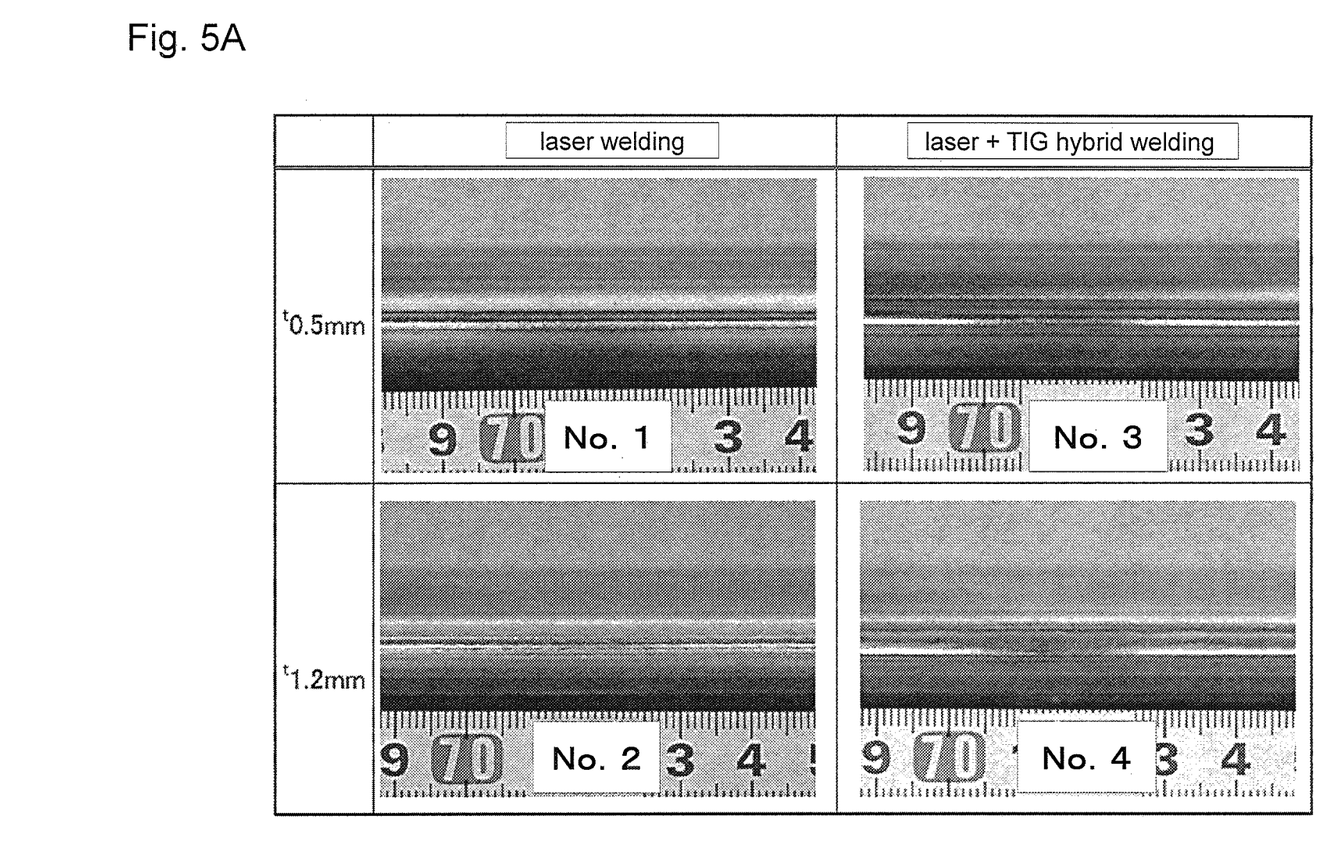
FIG. 5A is an optical microscopic photograph for observing the appearance of a welded part.

Welding was carried out in the conditions shown in Table 2 and in the same manner as in Experimental Example 1 about other conditions and the appearance and cross section of the welded part were observed. An appearance photograph and an optical microscopic photograph of a cross section (magnification: 50 times as large) are shown, respectively, in FIG. 5A and FIG. 5B.

Figure 5B:
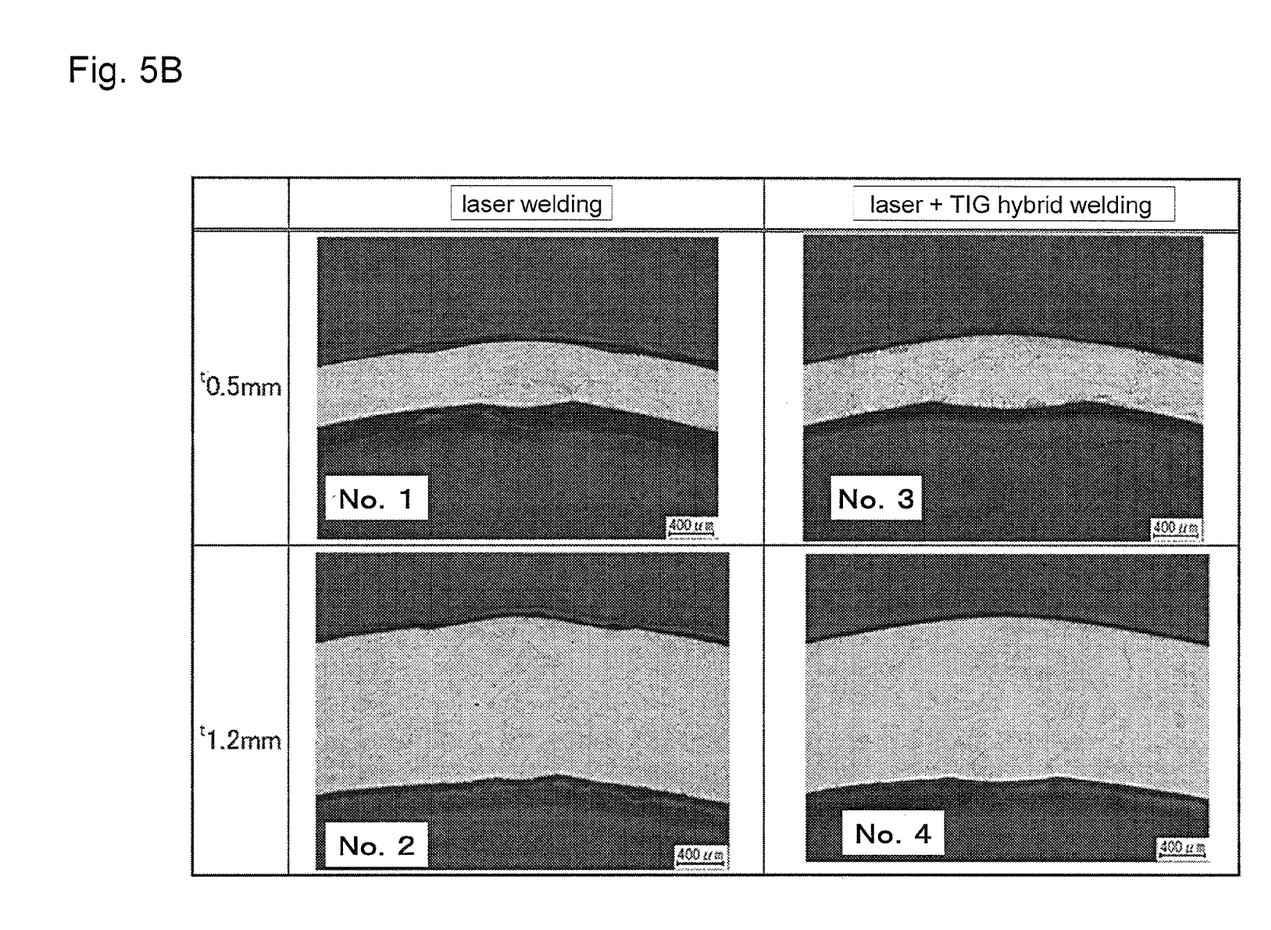
FIG. 5B is an optical microscopic photograph for observing a cross section of a welded part.

It can be understood that the bead shape is wider and smoother in the case of carrying out TIG arc welding following laser welding (FIG. 5A) and that the upper and lower bead ends become smoother as seen in the cross section (FIG. 5B). In the case the bead shape was observed after the electric current for TIG arc welding was changed in a range of 100 to 400 A, it was found that the upper limit of the electric current was preferably set to be about 200 A since the electric current became unstable because of fatigue of the electrode in the case of high output power although the bead width increased as the electric current increased.

TABLE 2

| Test No. | welding type | plate thickness (mm) | laser welding | | | | | TIG arc welding | | LA (mm) | welding speed (m/min) |
| --- | --- | --- | --- | --- | --- | --- | --- | --- | --- | --- | --- |
| | | | irradiation angle (°) | focal length (mm) | output power (kW) | defocused quantity (mm) | beam diameter (mm) | electric current (A) | torch angle (°) | | |
| 1 | laser alone | 0.5 | 5 | 250 | 5 | +20 | 2.4 | — | — | — | 15 |
| 2 | | 1.2 | 5 | | 3 | +9 | 1.3 | — | — | — | 6 |
| 3 | laser is followed by TIG | 0.5 | 5 | | 5 | +20 | 2.4 | 170 | 30 (angle of advance) | 5 | 15 |
| 4 | | 1.2 | 5 | | 3 | +9 | 1.3 | 170 | 30 (angle of advance) | 5 | 6 |

Experimental Example 3

Welding was carried out in the conditions shown in Table 3 and in the same manner as in Experimental Example 1 about other conditions and the bead shape was observed in the same manner as in Experimental Example 2.

TABLE 3

| Test No. | welding type | plate thickness (mm) | laser welding | | | | | TIG arc welding | | LA (mm) | welding speed (m/min) |
| --- | --- | --- | --- | --- | --- | --- | --- | --- | --- | --- | --- |
| | | | irradiation angle (°) | focal length (mm) | output power (kW) | defocused quantity (mm) | beam diameter (mm) | electric current (A) | torch angle (°) | | |
| 5 | laser is followed by TIG | 1.2 | 5 | 250 | 3 | +9 | 1.3 | 200 | 30 (angle of advance) | 5 | 6 |
| 6 | TIG is followed by laser | 1.2 | 5 | | 2.5 | +9 | | | 30 (angle of advance) | | |

Welding was possible in both cases of No. 5 and No. 6; however, the bead shape became a convex shape in the case of No. 6 in which TIG was carried previously and the TIG torch had a sweepback angle (that is, the tip end of the TIG torch was slanted in the reverse direction to welding moving direction from the downward vertical direction). In addition, since the object member to be welded was preheated by previously carrying out TIG in No. 6, welding was possible even at lower laser output power than in No. 5.

INDUSTRIAL APPLICABILITY

According to the present invention, welding excellent in a bead shape and few in welding defects can be carried out at a high welding speed and therefore, the present invention is useful.

The invention claimed is:

1. A laser/arc hybrid welding method for butt-welding flat plates of stainless steel, titanium, or a titanium alloy, or butt-welding both ends of a strip-shaped plate of stainless steel, titanium, or a titanium alloy which has been formed into a tubular shape, wherein
in a butted part, welding is carried out by making laser beam irradiation and arc discharge trace the same welding line in such a manner that laser welding is followed by TIG arc welding, wherein
a focal point of a laser beam for the laser welding is at a position above an object member to be welded and the laser beam is so defocused as to make the laser beam diameter radiated to the object member to be welded not smaller than 1 mm,
in the laser welding, the laser beam is radiated being slanted to the welding moving direction so that an angle between the vertical direction and the laser beam is within a range of 10° or narrower, and
in the TIG arc welding, a tip of a welding torch is slanted to the welding moving direction so that an angle between the vertical direction and the welding torch is within a range of 10 to 45°.

2. The welding method according to claim 1, wherein the interval LA between the position of laser beam irradiation in the laser welding and a targeted position of arc discharge in the TIG arc welding is 3 to 7 mm.

3. The welding method according to claim 1, wherein the welding is carried out in argon gas.

4. The welding method according to claim 1, wherein torch shield, after shield, and back shield in the TIG arc welding are carried out with argon gas.

5. The welding method according to claim 1, wherein preheating by TIG arc is carried out prior to the laser welding.

6. A method for producing a flat plate or tubular butt-welded member by the welding method according to claim 1.

* * * * *